US012607201B2

(12) United States Patent
Khorrami et al.

(10) Patent No.: US 12,607,201 B2
(45) Date of Patent: Apr. 21, 2026

(54) IMPELLER CONTAINMENT SYSTEM

(71) Applicant: PRATT & WHITNEY CANADA CORP., Longueuil (CA)

(72) Inventors: Hamid Khorrami, Longueuil (CA); Michael Fryer, Oakville (CA); Amir Masoud Tahvilian, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 108 days.

(21) Appl. No.: 18/418,741

(22) Filed: Jan. 22, 2024

(65) Prior Publication Data

US 2025/0237233 A1 Jul. 24, 2025

(51) Int. Cl.
*F04D 29/52* (2006.01)
*F01D 21/04* (2006.01)

(52) U.S. Cl.
CPC ......... *F04D 29/526* (2013.01); *F01D 21/045* (2013.01); *F05D 2220/3216* (2013.01); *F05D 2230/54* (2013.01); *F05D 2240/14* (2013.01)

(58) Field of Classification Search
CPC .. F04D 29/526; F04D 29/4206; F01D 21/045; F05D 2230/232; F05D 2230/54
See application file for complete search history.

(56) References Cited

U.S. PATENT DOCUMENTS

| | | | | |
|---|---|---|---|---|
| 2,968,468 | A * | 1/1961 | Welsh | F01D 9/044 415/137 |
| 4,902,201 | A * | 2/1990 | Neubert | F01D 21/045 181/204 |
| 5,601,406 | A | 2/1997 | Chan et al. | |
| 6,148,604 | A | 11/2000 | Salt et al. | |
| 6,182,531 | B1 * | 2/2001 | Gallagher | F01D 21/045 74/609 |
| 6,575,694 | B1 * | 6/2003 | Thompson | F01D 21/045 415/200 |
| 6,829,883 | B2 | 12/2004 | Sathianathan et al. | |
| 7,121,758 | B2 | 10/2006 | Mcmillan et al. | |
| 8,698,365 | B2 * | 4/2014 | Hull | F16F 15/315 74/572.11 |
| 9,540,954 | B2 | 1/2017 | Schlienger et al. | |
| 10,731,662 | B2 * | 8/2020 | Crutchfield | B29C 70/304 |
| 11,156,125 | B2 | 10/2021 | Clowes | |
| 12,378,894 | B1 * | 8/2025 | Bisson | F01D 9/04 |
| 2005/0025615 | A1 * | 2/2005 | Gabrys | F01D 21/045 415/9 |

(Continued)

OTHER PUBLICATIONS

European Search report issued in counterpart EP application No. 25153423.6 on Sep. 25, 2025.

*Primary Examiner* — Matthew T Largi
(74) *Attorney, Agent, or Firm* — NORTON ROSE FULBRIGHT CANADA LLP

(57) ABSTRACT

A compressor impeller containment system includes a catcher ring surrounding an impeller hub at an axial location spaced from the impeller blades. The catcher ring has a radially inner diameter surface and a radially outer diameter surface defining therebetween a radial thickness R1. The catcher ring has a hollow body portion extending along at most one third of the radial thickness R1 of the catcher ring as measured from the radially inner diameter surface, and a solid body portion extending radially outwardly from the hollow body portion to the radially outer diameter surface.

19 Claims, 3 Drawing Sheets

(56) References Cited

U.S. PATENT DOCUMENTS

| | | | | |
|---|---|---|---|---|
| 2016/0341070 | A1 | 11/2016 | Garcia et al. | |
| 2016/0341075 | A1* | 11/2016 | Liu | F01D 25/26 |
| 2018/0163562 | A1* | 6/2018 | Khare | F01D 25/24 |
| 2019/0128136 | A1* | 5/2019 | Kling | F01D 21/045 |
| 2020/0011203 | A1* | 1/2020 | Prabhakar | F01D 25/005 |
| 2025/0243774 | A1* | 7/2025 | Bisson | F01D 25/246 |

* cited by examiner

IMPELLER CONTAINMENT SYSTEM

TECHNICAL FIELD

The application relates generally to rotor containment structures and, more particularly, to a compressor impeller containment system.

BACKGROUND OF THE ART

Aviation regulations require engine manufacturers to demonstrate fragments containment following a compressor impeller tri-hub burst event. While known impeller containment structures have various advantages, there is still room in the art for improvement.

SUMMARY

In one aspect, there is provided a compressor impeller containment system comprising: an impeller mounted for rotation about an axis, the impeller having an impeller hub and impeller blades projecting radially outwardly from the impeller hub; and a catcher ring surrounding the impeller hub at an axial location spaced from the impeller blades, the catcher ring having a radial thickness R1 defined between a radially inner diameter surface and a radially outer diameter surface, the catcher ring further having a radially inner hollow portion extending from the radially inner diameter surface to an intermediate radial location between the radially inner diameter surface and the radially outer diameter surface, the radially inner hollow portion defining an internal cavity extending circumferentially around the axis, and a radially outer solid portion extending radially outwardly along a radial thickness R2 from the intermediate radial location to the radially outer diameter surface, wherein $\frac{3}{4}$ R1≥R2≥$\frac{1}{2}$ R1.

In another aspect, there is provided an auxiliary power unit comprising: a compressor including an impeller mounted for rotation about an axis, the impeller having an impeller hub and impeller blades projecting radially outwardly from the impeller hub; and a catcher ring disposed on a backside of the impeller blades directly around the impeller hub, the catcher ring having a radially outer diameter surface and a radially inner diameter surface, the radially inner diameter surface disposed radially adjacent to a radially outer surface of the impeller hub, the radially inner diameter surface and the radially outer diameter surface defining therebetween a radial thickness R1 of the catcher ring, and wherein the catcher ring has a hollow body portion extending along at most one third of the radial thickness R1 of the catcher ring as measured from the radially inner diameter surface, and a solid body portion extending radially outwardly from the hollow body portion to the radially outer diameter surface.

In a further aspect, there is provided a compressor impeller hub containment ring comprising: a sheet metal inner ring component concentrically mounted inside a forged outer ring component, the sheet metal inner ring component having an open cross-section, the forged outer ring component having a solid cross-section, the forged outer ring component closing the open cross-section of the sheet metal inner ring and cooperating therewith to form an internal cavity around an inner circumference of the compressor impeller hub containment ring.

DESCRIPTION OF THE DRAWINGS

Reference is now made to the accompanying figures in which.

DETAILED DESCRIPTION

Figure 1:
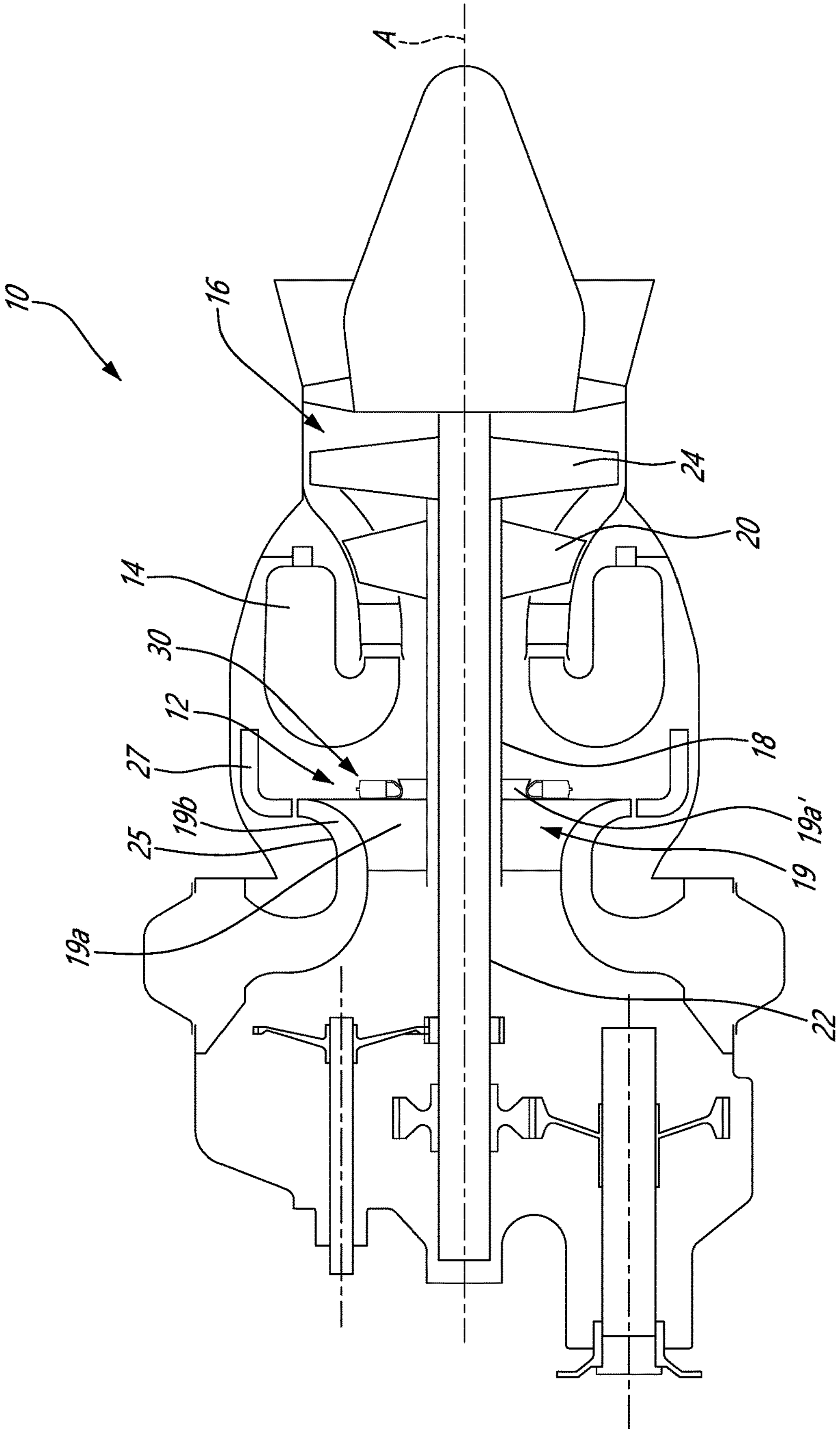
FIG. 1 is a schematic cross-section view of a turboshaft engine comprising a compressor impeller containment system including an impeller hub catcher ring having a radially inner hollow portion.

FIG. 1 illustrates a turboshaft engine 10 suitable for use as an auxiliary power unit (APU) of an aircraft. The engine 10 generally comprises in serial flow communication, a compressor section 12 for pressurizing the air, a combustor 14 in which the compressed air is mixed with fuel and ignited for generating an annular stream of hot combustion gases, and a turbine section 16 for extracting energy from the combustion gases.

The engine 10 in this example can be seen to include a high pressure spool 18, including a compressor impeller 19 and a high-pressure turbine 20, and a low pressure spool 22, including a low-pressure turbine 24. The low pressure spool 22 leads to a power shaft via a gear arrangement. The high pressure spool 18 can be refer to herein as a compressor spool and the low pressure spool 22 can be referred to herein as the power spool.

The exemplified compressor impeller 19 is provided in the form of a centrifugal impeller mounted for rotation about the engine axis A. The impeller 19 comprises an annular hub 19*a* and a set of circumferentially distributed impeller blades 19*b* integrally projecting from the hub 19*a* for compressing incoming air as the blades 19*b* rotate with the hub 19*a*. An impeller shroud 25 has a curved portion that closely contours a shape of the blades 19*b*. The shroud 25 and the impeller blades 19*b* are configured for directing the compressed air radially outwardly into a diffuser 27 surrounding the tip of the impeller blades 19*b*.

Generally, engine rotors, such as the compressor impeller 19, are limited by fatigue strength. Consequently, their burst speeds can be considerably higher than operating speeds. When a rotor bursts, the fragments retain virtually all the rotor's original rotational energy. Each fragment now has two components of energy: a rotational component and a translational component. In practice, a rotor will break from a single failure origin, often from a fault in the bore of the annular hub where the stress is often the maximum. The exact fracture mode is unpredictable and can result in fragments of various sizes and shapes. The theoretical configuration which produces the maximum proportion of energy, and therefore the most dangerous configuration, is a failure which produces three equal weight pieces. Therefore, this is the mode usually prescribed for testing, and it is known as a "tri-hub failure". Testing are usually achieved by deliberately cutting equally spaced slots in the hub to thereby weaken it to the point where it bursts at, or marginally above, the maximum operating speed. The tri-hub failure mode has become a standard for testing. Engine manufacturers have to demonstrate by testing that the containment structure around the compressor impeller is strong enough to absorb the energy of the three parts when the impeller breaks apart during such a test.

Heretofore, rotor containment structures have been axially long and radially thick such that their cross-sections have been massive relative to adjacent normal engine structure. A common assumption among designers is that the containment rings circumscribing engine rotors must have as much weight as possible to absorb the energy of the burst fragments by deflecting and expanding. However, as will be seen hereafter, the inventors have found that it is possible to minimize the weight of an impeller containment structure without negatively affecting its energy absorption capacity by introducing a compliant hollow portion in the radially inner half portion of a catcher ring surrounding the hub of the impeller.

Referring to FIG. 1, it can be seen that the containment system of the impeller 19 comprises a catcher ring 30 for protecting engine components from tri-hub burst. The catcher ring 30 is made of strong material such as Inconel® 625 steel, titanium or the like. The catcher ring 30 surrounds the impeller hub 19*a* at an axial location spaced from the impeller blades 19*b*. For instance, the catcher ring 30 may be axially positioned at the downstream end of the impeller hub 19*a* on the back side of the impeller blades 19*b* and in closed radial proximity to a cylindrical neck portion 19*a*' of the impeller hub 19*a* (i.e., the radially inner diameter surface of the catcher ring 30 is directly radially next to the radially outer surface of the neck portion 19*a*' of the impeller hub 19*a*). Such close proximity is intended to restrict the motion of any burst fragments before they gain too much kinetic energy. In so doing, the entire volume of the containment structure is utilized in the containment process, wherein in applications where the containment structure is remote from the respective hub, the translational impacts are on localized regions of the structure so that the structure is unevenly loaded and the material is less efficiently utilized. The catcher ring 30 is coaxially supported around the impeller hub 19*a* by any appropriate structural components of the engine 10. For instance, the catcher ring 30 may be welded or otherwise suitably mounted to a hairpin connector (not shown) which is, in turn, bolted or otherwise suitably mounted to a structural case of the engine 10.

Figure 2:
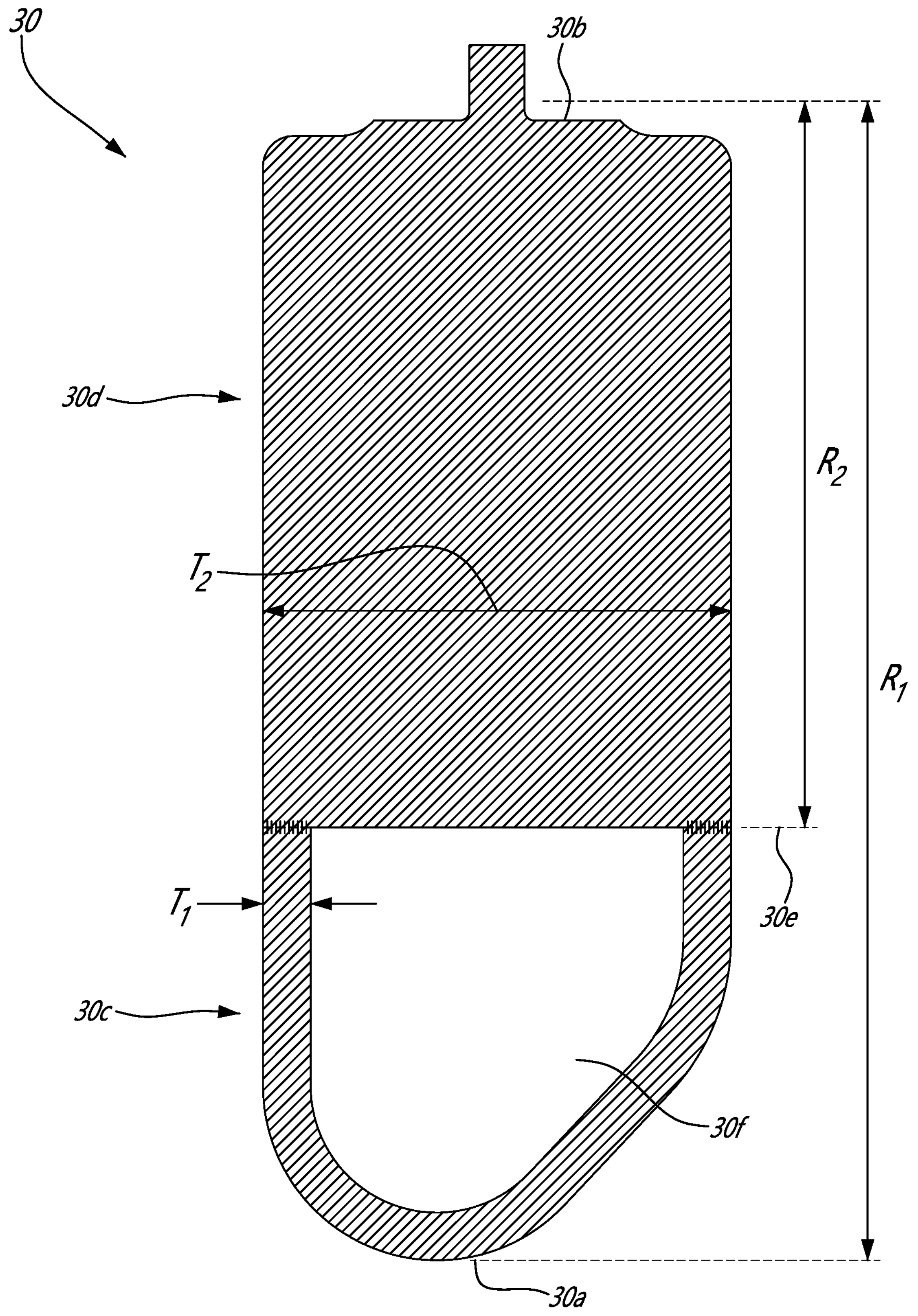
FIG. 2 is a cross-section view of the catcher ring illustrating relative geometrical parameters between the radially inner hollow portion and the radially outer solid portion of the catcher ring.

FIG. 2 illustrates a cross-section of the catcher ring 30. It can be appreciated that the catcher ring 30 has a total radial thickness R1 extending from a radially inner diameter surface 30*a* to a radially outer diameter surface 30*b*. The catcher ring 30 is characterized by a radially inner hollow portion 30*c* circumscribed by a radially outer solid portion 30*d*. The radially inner hollow portion 30*c* extends radially from the radially inner diameter surface 30*a* to an intermediate location 30*e* between the radially inner diameter surface 30*a* and the radially outer diameter surface 30*b*. The radially inner hollow portion 30*c* defines an internal cavity 30*f* extending circumferentially continuously around the central axis of the catcher ring 30. According to some embodiments, the internal cavity 30*f* has a constant section along its circumference. However, it is understood that the cross-section of the cavity 30*f* may vary along its circumference. The radially outer solid portion 30*d* extends radially from the intermediate location 30*e* to the radially outer diameter surface 30*b*. Analytical results have shown that with such a hollow ring configuration, it is possible to reduce the mass of the catcher ring 30 by about 25% while virtually preserving the same energy absorption capacity as that of a solid ring having the same outline dimensions. Indeed, the radially inner hollow portion 30*c* may be configured to plastically deform under the impact of the tri-hub burst fragments, thereby absorbing energy. The burst fragments hitting the radially inner diameter surface 30*a* of the catcher ring 30, introduce a high hoop or circumferential stress on the radially inner hollow portion 30*c* of the catcher ring 30, thereby causing the radially inner hollow portion 30*c* to deform and, thus, absorb energy. In contrast, the solid radially inner portion of conventional solid rings tend to fracture under the impact of the burst fragments, thereby preventing the radially inner portion of solid rings to fully contribute to the energy absorption process. By removing some of the mass from the radially inner half of the catcher ring 30 to form a hollow compliant portion, it may be possible to initially absorb more energy via radial deflection than it would be feasible via fracture. Once fractured, the radially inner hollow portion 30*c* looses its capacity to resist against the hoop energy of the burst fragments. However, the radially outer solid portion 30*d* is configured to resist against the remaining hoop energy of the burst fragments amortized by the radially inner hollow portion 30*c*.

As can be appreciated from FIG. 2, the radially outer solid portion 30*d* has a radial thickness R2. According to some embodiments, the radial thickness R2 is more than half the total radial thickness R1 of the catcher ring 30 and equal or less than three quarter of the total radial thickness R1. It has been found that this range of radial thickness ratios allows to reduce the weight of the catcher ring 30 without negatively affecting the energy absorption capacity thereof. According to some engine applications, satisfactory results have been obtained with a radial thickness of the radially inner hollow portion 30*c* equal to or less than about one third of the total radial thickness R1 (that is with R2≥⅔ R1). Still according to some embodiments, the thickness T1 of the wall of the radially inner hollow portion 30*c* is less than about ⅛ of the axial thickness T2 of the radially outer solid portion 30*d* as defined between opposed front and back faces of the catcher ring 30. Still referring to FIG. 2, it can be appreciated that the cross-section area A1 of the internal cavity 30*f* is less than the cross-section area A2 of the radially outer solid portion 30*d* of the exemplified catcher ring 30. According to some embodiments, the cross-section area A1 of the internal cavity 30*f* is less than half the cross-section area A2 of the radially outer solid portion 30*d*. According to some embodiments, some or all of the above relative parameters between the radially inner hollow portion 30*c* and the radially outer solid portion 30*d* of the catcher ring 30 may be combined to optimize weight savings without negatively affecting the containment functionality of the catcher ring 30.

Figure 3:
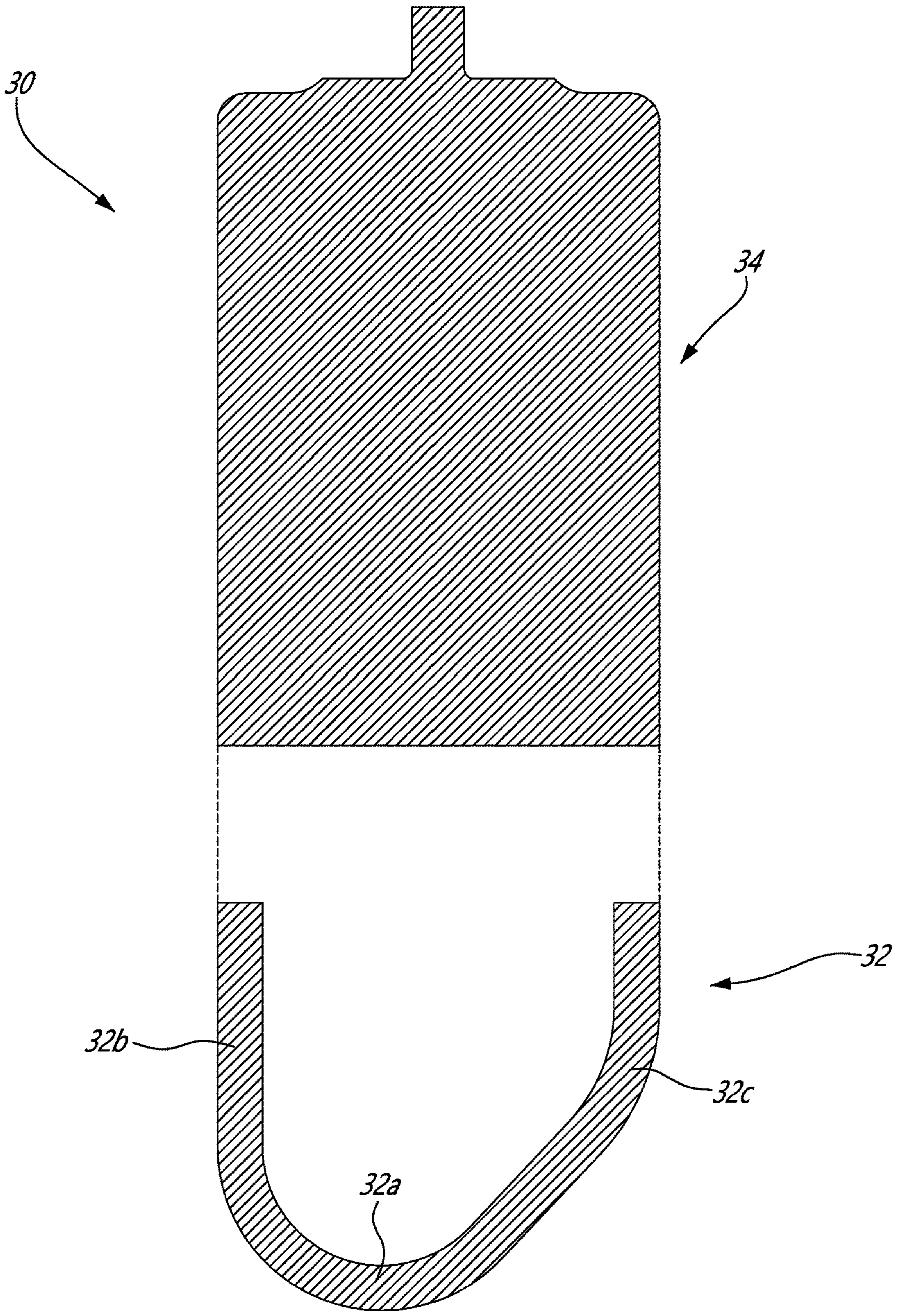
FIG. 3 is a cross-section view illustrating separately manufactured radially outer and radially inner parts of the catcher ring prior to being welded together according to one possible method of manufacturing the catcher ring.

Referring now to FIG. 3, it can be appreciated that the catcher ring 30 may consist of an assembly of two separately manufactured components. For instance, according to some embodiments, the catcher ring 30 may comprise a sheet metal inner ring component 32 concentrically mounted inside a forged outer ring component 34, the sheet metal inner ring component 32 and the forged outer ring component 34 respectively forming the radially inner hollow portion 30*c* and the radially outer solid portion 30*d* of the catcher ring 30.

The sheet metal inner ring component 32 may be rolled formed into an open cross-section ring. According to the illustrated embodiment, the rolled sheet metal inner ring component 32 has a generally U-shaped cross-section and includes a curved bridging portion 32*a* between a front leg portion 32*b* and a back leg portion 32*c*. The curved bridging portion 32*a* provides for a convex surface at the radially inner diameter of the catcher ring 30 adjacent to the impeller hub 19*a*. Still referring to FIG. 3, it can be appreciated that the back leg portion 32*c* extends axially away from the front leg portion 32*b* as the back leg portion 32*c* extends radially outwardly from the bridging portion 32*a*. This provides a radially inner annular surface that flares radially outwardly as it extends axially in a rearward direction. Such a surface profile at the radially inner diameter of the catcher ring is designed to provide a uniform gap between the catcher inner diameter and the impeller neck 19*a'*.

The sheet metal inner ring component 32 is welded at its outer diameter to the inner diameter of the forged outer ring component 34. As schematically illustrated in FIG. 2, the radially inner and the radially outer components 32, 34 may be welded or brazed along a weld line provided at the intermediate location 30*e*. Once so joined to the outer diameter of the sheet metal inner ring component 32, the forged outer ring component 34 closes the open cross-section of the sheet metal inner ring component 32 and cooperate therewith to form the internal cavity 30*f*. As can be appreciated from FIG. 2, the resulting internal cavity 30*f* has a tapering profile in a radially inward direction. The inner and outer profiles of the radially inward tapering cavity are similar to provide a uniform thickness. It is understood that the thickness is adjusted based on detailed calculations/analyses for each specific engine.

Referring back to FIG. 3, it can be appreciated that the forged outer ring component 34 has a solid rectangular cross-section. However, it is understood that the forged outer ring component 34 could have other cross-section shapes.

The operation of the catcher ring 30 is as follows. In the unlikely event of an impeller hub failure, the impeller hub 19*a* will tend to burst away from its associated drive shaft in a rearward and radially outward direction. The burst impeller fragments will immediately hit the inner diameter surface 30*a* of the closely surrounding catcher ring 30. As a result, the radially inner hollow portion 30*c* of the catcher ring 30 will radially deform, thereby absorbing energy. The inner hollow portion 30*c* will deflect until fracture. After the failure of the radially inner hollow portion 30*c*, the radially outer solid portion 30*d* of the catcher ring 30 will continue to resist against hoop energy to contain the burst fragments and, thus, mitigate damages on the structural parts surrounding around the impeller 19.

As can be appreciated from the foregoing description, the material cross-section required to provide the necessary shear and hoop strength to contain the burst can be minimized to reduce weight, while still maintaining a sufficient factor of safety for protection of the engine and aircraft systems and structure. This can be generally achieved by absorbing the initial energy of the burst by plastic deformation of a compliant hollow portion in the radially inner half of the catcher ring 30.

According to at least some embodiments, the hollow catcher ring is designed to minimize added material and thus added weight to the engine while still effectively protecting engine components from tri-hub burst.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

While the description may present method and/or process steps as a particular sequence, it is understood that, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. As used herein, the term "about" is intended to allow for a 10% variation of the associated numerical values.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, it is understood that while the containment system has been described in the context of an auxiliary power unit engine, it is understood that similar principles could be utilized in other types of engines, pump, fans, etc., that include a compressor impeller. Other applications of this impeller containment system, such as in power generators used on land vehicles or in motors utilized in non-aerospace applications, are considered to be within the scope of the present application. Other applications such as would be recognized by the person of ordinary skill in the art are considered to be within the scope of the present disclosure. Yet further modifications could be implemented by a person of ordinary skill in the art in view of the present disclosure, which modifications would be within the scope of the present technology.

The invention claimed is:

1. A compressor impeller containment system comprising:

an impeller mounted for rotation about an axis, the impeller having an impeller hub and impeller blades projecting radially outwardly from the impeller hub; and a catcher ring surrounding the impeller hub at an axial location spaced from the impeller blades, the catcher ring having a radial thickness R1 defined between a radially inner diameter surface and a radially outer diameter surface, the catcher ring further having a radially inner hollow portion extending from the radially inner diameter surface to an intermediate radial location between the radially inner diameter surface and the radially outer diameter surface, the radially inner hollow portion defining an internal cavity extending circumferentially around the axis, and a radially outer solid portion extending radially outwardly along a radial thickness R2 from the intermediate radial location to the radially outer diameter surface, wherein $\frac{3}{4}$ R1≥R2≥$\frac{1}{2}$ R1.

2. The compressor impeller containment system of claim 1, wherein R2≥$\frac{2}{3}$R1.

3. The compressor impeller containment system of claim 2, wherein the radially inner hollow portion of the catcher ring has a wall thickness T1, wherein the radially outer solid portion of the catcher ring has an axial thickness T2 defined between opposed axial faces of the catcher ring, and wherein T1<$\frac{1}{8}$ T2.

4. The compressor impeller containment system of claim 1, wherein the internal cavity of the radially inner hollow portion of the catcher ring has a cross-section area A1, wherein the radially outer solid portion of the catcher ring has a cross-section area A2, and wherein A1<$\frac{1}{2}$ A2.

5. The compressor impeller containment system of claim 2, wherein the radially inner hollow portion has a wall thickness T1 and the internal cavity has a cross-section area A1, wherein the radially outer solid portion has an axial thickness T2 defined between opposed axial faces of the catcher ring and a cross-section area A2, and wherein:

T1<$\frac{1}{8}$ T2; and

A1<$\frac{1}{2}$ A2.

6. The compressor impeller containment system of claim 1, wherein the radially outer solid portion includes a forged component, wherein the radially inner hollow portion includes a rolled sheet component, and wherein the rolled sheet component is welded to the forged component along a circumferential weld line at the intermediate radial location.

7. The compressor impeller containment system of claim 6, wherein the rolled sheet component has a generally U-shaped cross-section.

8. The compressor impeller containment system of claim 7, wherein the forged component has a generally rectangular cross-section.

9. The compressor impeller containment system of claim 1, wherein the radially inner hollow portion of the catcher ring has a constant cross-section along a full circumference of the catcher ring.

10. The compressor impeller containment system of claim 1, wherein the radially inner diameter surface of the catcher ring has a convex curvature.

11. The compressor impeller containment system of claim 1, wherein the catcher ring is axially positioned on a back side of the impeller, and wherein the internal cavity is axially and radially inwardly bounded by a U-shaped wall including a curved bridging portion between a front leg portion and a back leg portion, and wherein the back leg portion extends axially away from the front leg portion as the back leg portion extends radially outwardly from the curved bridging portion.

12. An auxiliary power unit comprising:

a compressor including an impeller mounted for rotation about an axis, the impeller having an impeller hub and impeller blades projecting radially outwardly from the impeller hub; and a catcher ring disposed on a backside of the impeller blades directly around the impeller hub, the catcher ring having a radially outer diameter surface and a radially inner diameter surface, the radially inner diameter surface disposed radially adjacent to a radially outer surface of the impeller hub, the radially inner diameter surface and the radially outer diameter surface defining therebetween a radial thickness R1 of the catcher ring, and wherein the catcher ring has a hollow body portion extending along at most one third of the radial thickness R1 of the catcher ring as measured from the radially inner diameter surface, and a solid body portion extending radially outwardly from the hollow body portion to the radially outer diameter surface.

13. The auxiliary power unit of claim 12, wherein the hollow body portion defines an internal cavity extending circumferentially continuously around the impeller hub, the internal cavity having a tapering profile in a radially inward direction.

14. The auxiliary power unit of claim 13, wherein the catcher ring comprises an inner ring component welded to an outer ring component, the inner ring component having a U-shaped cross-section, the outer ring component having a solid cross-section, the internal cavity defined between the inner ring component and the outer ring component.

15. The auxiliary power unit of claim 14, wherein the inner ring component has a wall thickness T1, wherein the outer ring component has an axial thickness T2 defined between opposed front and back faces of the catcher ring, and wherein T1<$\frac{1}{8}$ T2.

16. The auxiliary power unit of claim 14, wherein the internal cavity has a cross-section area A1, wherein the outer ring component has a cross-section area A2, and wherein A1<$\frac{1}{2}$ A2.

17. A compressor impeller hub containment ring comprising: a sheet metal inner ring component concentrically mounted inside a forged outer ring component, the sheet metal inner ring component having an open cross-section, the forged outer ring component having a solid cross-section, the forged outer ring component closing the open cross-section of the sheet metal inner ring and cooperating therewith to form an internal cavity around an inner circumference of the compressor impeller hub containment ring, wherein the forged outer ring component extends radially along more than half and less than three quarters of a total radial thickness of the compressor impeller hub containment ring.

18. The compressor impeller hub containment ring of claim 17, wherein the forged outer ring component has a radial thickness R2, and wherein R2 is greater or equal to two thirds of the total radial thickness of the compressor impeller hub containment ring but less than three quarters of the total radial thickness.

19. The compressor impeller hub containment ring of claim 17, wherein the sheet metal inner ring component has a U-shaped cross-section, and wherein the sheet metal inner ring is welded along its outer circumference to a radially inner diameter surface of the forged outer ring component.

* * * * *